Figure 1:
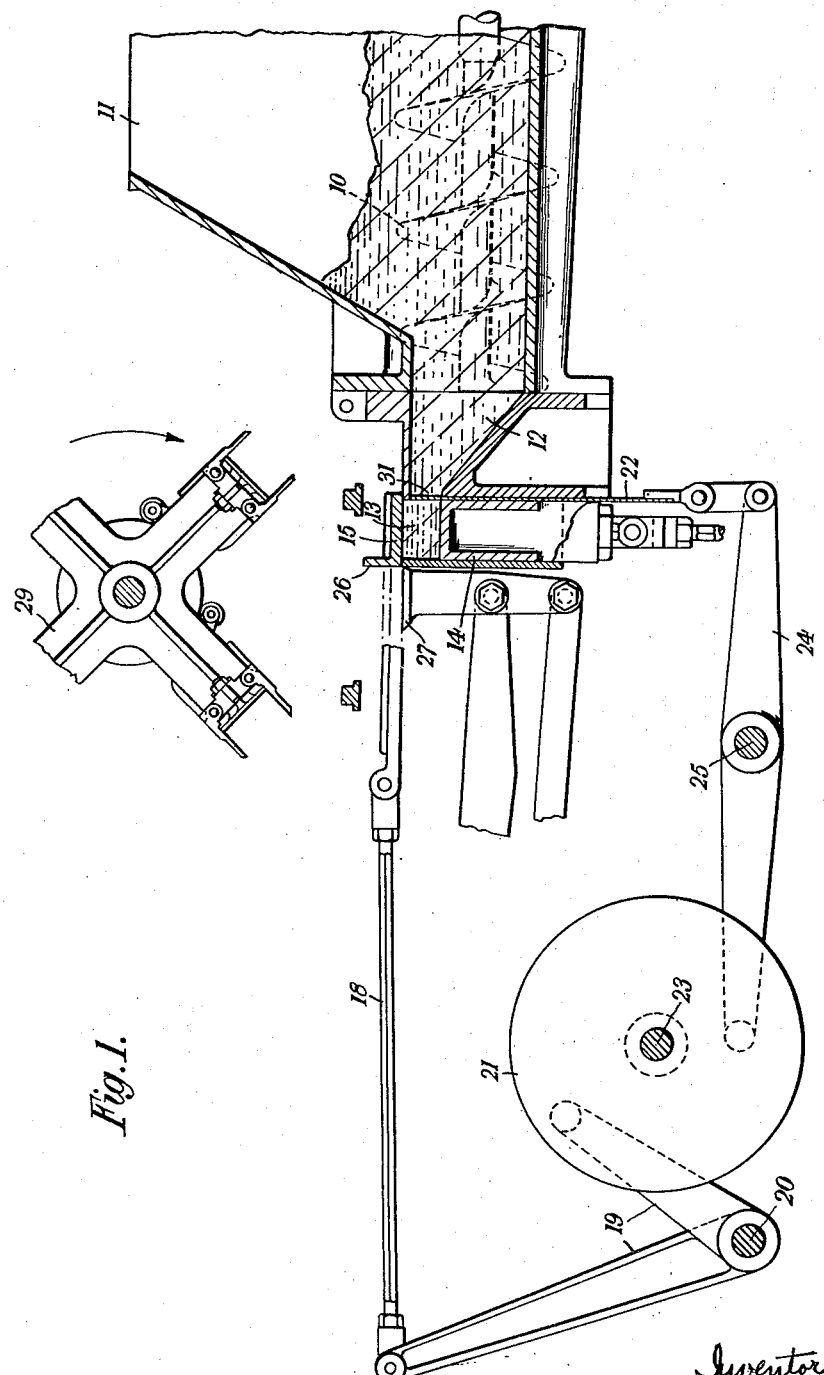

April 2, 1946.  A. RUSSELL ET AL  2,397,812
MACHINE FOR WRAPPING PLASTIC MATERIALS
Filed March 9, 1944  2 Sheets-Sheet 1

April 2, 1946. A. RUSSELL ET AL 2,397,812
MACHINE FOR WRAPPING PLASTIC MATERIALS
Filed March 9, 1944 2 Sheets-Sheet 2
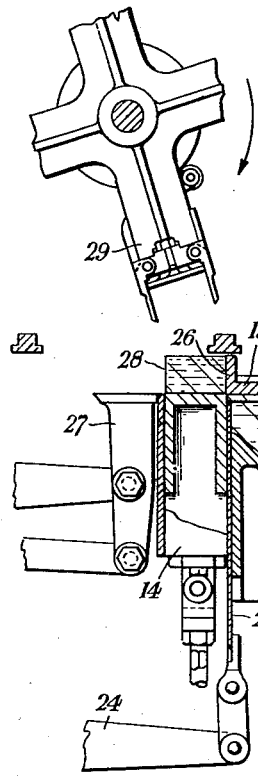
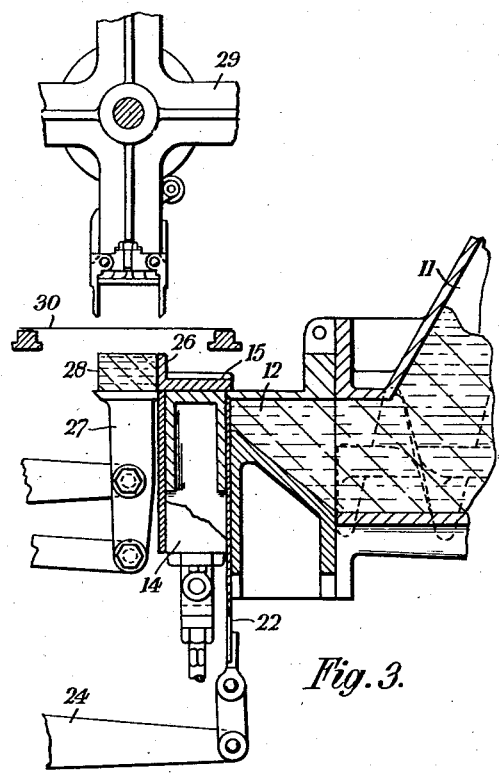
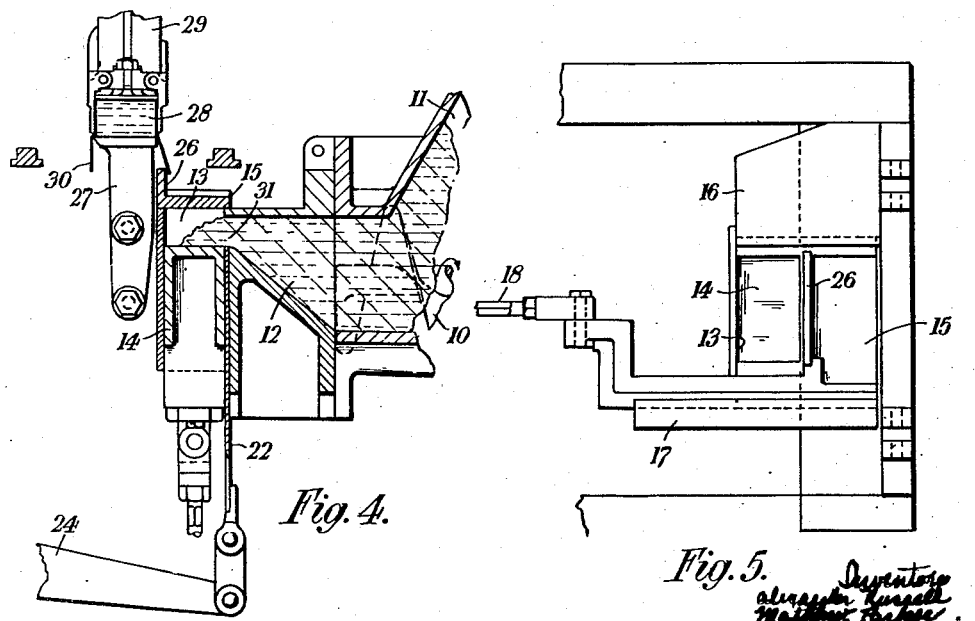

Patented Apr. 2, 1946

2,397,812

UNITED STATES PATENT OFFICE 2,397,812

MACHINE FOR WRAPPING PLASTIC MATERIALS

Alexander Russell, Matthew Parker, and Richard Anson Harris, Leeds, England, assignors to The Forgrove Machinery Company Limited, Leeds, England, a company of Great Britain Application March 9, 1944, Serial No. 525,684
In Great Britain May 5, 1943

3 Claims. (Cl. 93—2)

This invention relates to machines for wrapping plastic material, such as margarine, butter or the like of the kind comprising a die chamber, means for charging the die chamber with the plastic material, a reciprocating die plunger constituting the bottom of the die chamber and operating to discharge from the top of the die chamber shaped blocks of the material, and a top cover for the die chamber which is moved to close the top of the die chamber while the material is being fed into it and to open the top of the die chamber during the delivery stroke of the plunger.

In machines of this kind it has been the practice to arrange for the plunger to lift the shaped block or "print" of material out of the die chamber and into the gripper jaws of a wrapping wheel. This, however, leads to difficulties. Not only is the construction of the wrapping wheel rendered complicated because of the necessity for providing for horizontal sliding movement of the gripper jaws to remove the print from the plunger, as explained in our copending United States application Serial No. 525,685, but the time required for the long plunger stroke demanded by this scheme reduces the time available for feeding the material into the die chamber.

According to the invention, we arrange for the plunger to terminate its upward delivery stroke with its upper surface level with the undersurface of the top cover and to dwell in its up position until the top cover has moved to close the top of the die box, the top cover thus sliding the print off the plunger. By employing the die plunger purely to determine the dimensions of the print and discharge it from the die chamber, and using the top cover to transfer it to some separate agency for delivering it to the wrapping wheel, we are able to effect a considerable reduction in the stroke of the plunger and so have more time available for feeding the material into the die chamber.

Also, since the plunger dwells in its up position until the top cover has moved to close the top of the die chamber, we shall probably be able to dispense with the air escape holes which are usually provided in the die chamber. We expect that this will result in the delivery of more accurately measured quantities of material from the die chamber. It will in any case give the advantage of eliminating the waste due to the squeezing of a certain amount of material through the air escape holes and make it possible to dispense with the waste chute employed for collecting this material, thus saving space and simplifying the construction and layout of the machine.

It has been proposed, in a machine in which the die plunger moves up out of the die chamber to deliver the prints direct to the wrapping wheel, to arrange for the plunger to dwell on its down stroke in an intermediate position in which its upper surface is flush with the undersurface of the top cover and so dispense with the air escape holes. This arrangement, however, necessitates that the top and intermediate positions of the plunger must be very accurately maintained, and it is practically impossible to arrange for this while at the same time providing for adjustment in the bottom position of the plunger to regulate the weight of material delivered in each print. Such adjustment is generally required to accommodate variations in the material during wrapping, due mainly to temperature changes. Moreover the time required for the dwell of the plunger in its intermediate position can only be obtained at the expense of other movements which can ill spare it, thus limiting the speed of operation of the machine.

Although our arrangement necessitates the use of an independent mechanism for delivering the prints to the wrapping wheel, it nevertheless permits of an increase in the machine speed as compared with the known machines by virtue of the more favourable time distribution.

One specific embodiment of the invention will now be described in greater detail, by way of example, with reference to the accompanying drawings, in which:

Figs. 1–4 are side elevations partly in section, all showing the die chamber, die plunger, top cover, knife, charging means for the die chamber, and other parts, these figures showing successive stages in a cycle of machine operations, Fig. 1 representing the completion of the charging of the die chamber with margarine or like plastic material, Fig. 2 the completion of the delivery stroke of the plunger, Fig. 3 the completion of the transfer of the print by the top cover from the die plunger to a lifting plunger, and Fig. 4 the commencement of a fresh charging phase and the lifting of the print into the jaws of the wrapping wheel.

Fig. 5 is a plan view, corresponding to Fig. 2, of the die chamber and top cover.

Like reference numerals indicate like parts throughout the figures.

The margarine or like plastic material to be wrapped, is fed by intermittently rotating feed worms, one of which is shown at 10, from a feed hopper 11 to an extrusion box 12 located to one side of a rectangular section die chamber 13. In the die chamber is a reciprocating die plunger 14, which constitutes the bottom of the chamber. The chamber is charged with margarine through an extrusion orifice constituted by a lateral opening 31 when the die plunger is in its bottom position. This will be clear from Fig. 4, which illustrates the commencement of an extrusion operation.

The top of the die chamber is closed during extrusion, by a sliding top cover plate 15, which moves in guides in fixed brackets 16, 17 (Fig. 5) and is operated by a rod 18 linked to a bell crank 19, which is periodically rocked to-and-fro about a fixed shaft 20 by a cam 21 on the cam shaft 23 (Fig. 1). A reciprocating knife 22 controls communication between the extrusion box 12 and the die chamber 13, the knife being operated by another cam on the cam shaft 23 through the agency of a lever 24 pivoted on a fixed shaft 25 (Fig. 1). During extrusion the knife is in the down position, permitting of extrusion of the margarine from the extrusion box into the die chamber. After the feed worms 10 have ceased to rotate, the knife 22 moves up to close the extrusion orifice (see Fig. 1), the displacement of margarine caused by this upward movement of the knife ensuring that the die chamber is completely filled. The knife, when in the up position, cuts off the die chamber from residual pressure in the extrusion box. When the material is soft this residual pressure might, but for the presence of the knife, cause some of the material to ooze out of the top of the die chamber as soon as the top plate 15 begins to uncover the die chamber.

The top cover plate 15 moves to open the top of the die chamber when extrusion has been completed. Immediately afterwards the plunger 14 rises to its top position (Fig. 2), in which its upper surface is level with the undersurface of the top cover plate 15. The latter then slides to the left (Fig. 3), whereupon an upstanding flange 26 on the top cover plate pushes the extruded block or "print" 28 of margarine off the die plunger 14 and on to a lifting plunger, indicated diagrammatically at 27, which thereafter transfers it to the pocket of a wrapping wheel 29. It will be observed from Figs. 2 and 3 that when the lifting plunger is in its down position and the die plunger is in its up position, the upper surfaces of said plungers are at the same level so that the top cover is able to slide the extruded block smoothly off the die plunger and on to the lifting plunger.

The construction and operation of the lifting plunger 27 and wrapping wheel 29 are fully described in our copending United States application Serial No. 525,685. It will be sufficient to state here that the wrapping wheel 29 rotates intermittently, assuming the successive positions illustrated. Wrappers, one of which is shown at 30 (Fig. 3), are delivered in succession into position above the lifting plunger 27, by the mechanism described in our United States application Serial No. 511,670, so that each print 28 carries a wrapper with it, as shown in Fig. 4, as it is lifted into the jaws of the wrapping wheel, the wrapper being folded in inverted U-form about the print.

As illustrated, the die plunger 14 always travels to a fixed upper position (Figs. 2 and 3) in which its upper surface is level with the undersurface of the top cover plate 15, and it dwells in this top position (see Fig. 3) as the top cover plate moves across to close the upper end of the die box, ready for the next extrusion operation. The bottom position of the die plunger 14 is, however, adjustable by the mechanism described in our copending United States application Serial No. 523,686, for the purpose of varying the volume of margarine which will be extruded from the die chamber at each delivery stroke of the die plunger.

What we claim as our invention and desire to secure by Letters Patent is:

1. In a machine for shaping and wrapping plastic materials, the combination with a wrapping wheel, and a reciprocating lifting plunger for lifting shaped blocks of the plastic material into the wrapping wheel, of an extrusion device for forming said shaped blocks, said extrusion device comprising a die chamber, means for charging the die chamber periodically with plastic material, a reciprocating die plunger constituting the bottom of the die chamber, means for reciprocating the die plunger from a down position to an up position in which its upper surface is level with the top of the die chamber, said die plunger dwelling in said up position, and a reciprocating top cover for the die chamber, said top cover constituting a closure for the die chamber during formation of the blocks and operating, while the die plunger is dwelling in the up position, to transfer the shaped blocks of plastic material in succession from the die plunger to the lifting plunger.

2. In a machine for shaping and wrapping plastic materials, the combination of a wrapping wheel, an extrusion device for forming the plastic material into shaped blocks, said extrusion device comprising a die chamber, means for charging said die chamber periodically with plastic material, a die plunger constituting the bottom of the die chamber, means for reciprocating said die plunger from a bottom position to a top position in which its upper surface is level with the top of the die chamber and for causing said die plunger to dwell in said top position, and a reciprocating top cover for the die chamber which cooperates with the die plunger to define the shape of said blocks, and operates, while the die plunger is dwelling in the top position, to slide said blocks horizontally off the die plunger, and a lifting plunger for receiving the blocks delivered from the extrusion device by said top cover and lifting them in succession into the wrapping wheel.

3. In a machine for shaping and wrapping plastic materials, the combination of a wrapping wheel, an extrusion device for forming the plastic material into shaped blocks, said extrusion device comprising a die chamber, means for charging said die chamber periodically with plastic material, a die plunger constituting the bottom of the die chamber, means for reciprocating said die plunger from a bottom position to a top position in which its upper surface is level with the top of the die chamber and for causing said die plunger to dwell in said top position, and a reciprocating top cover for the die chamber which cooperates with the die plunger to define the shape of said blocks, and a lifting plunger for lifting the shaped blocks in succession into the wrapping wheel, said lifting plunger being at the same level as the die plunger when said die plunger is dwelling in its top position and said top cover operating to slide the shaped blocks in succession off the die plunger and on to the lifting plunger.

ALEXANDER RUSSELL.
MATTHEW PARKER.
RICHARD ANSON HARRIS.